(No Model.) 3 Sheets—Sheet 2.
F. L. MURATORI & E. CROS.
APPARATUS FOR REGULATING OR CONTROLLING FROM A DISTANCE THE FLOW OF GASES.
No. 314,188. Patented Mar. 17, 1885.
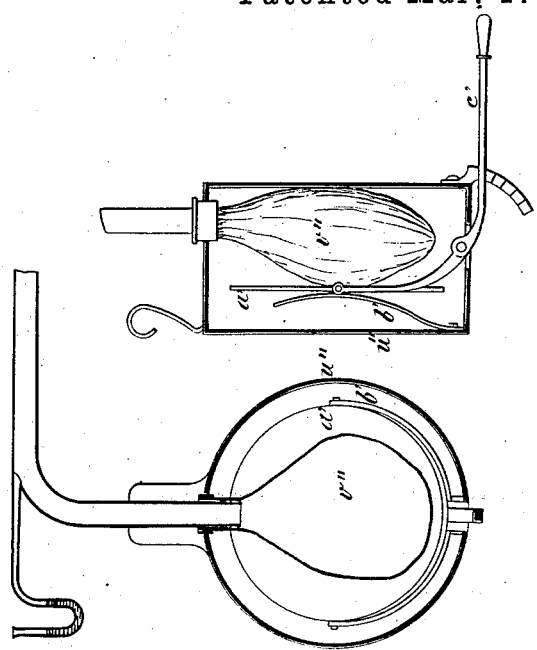
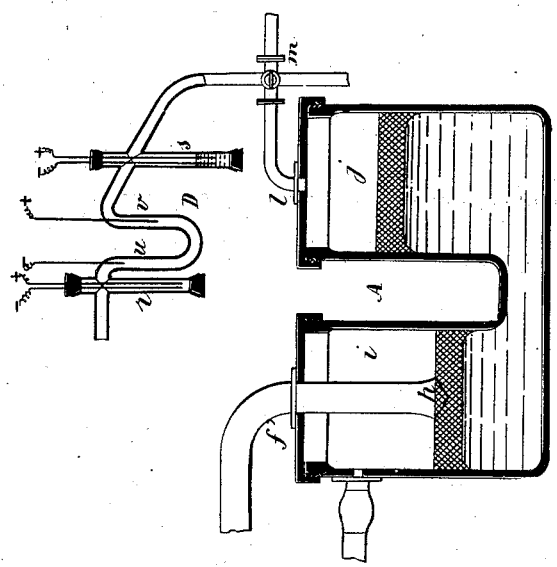
Witnesses:
John M. Speer.
Gustav Schneppé.
Inventor.
F. L. Muratori
E. Cros
by their attorneys
Briesen & Steele

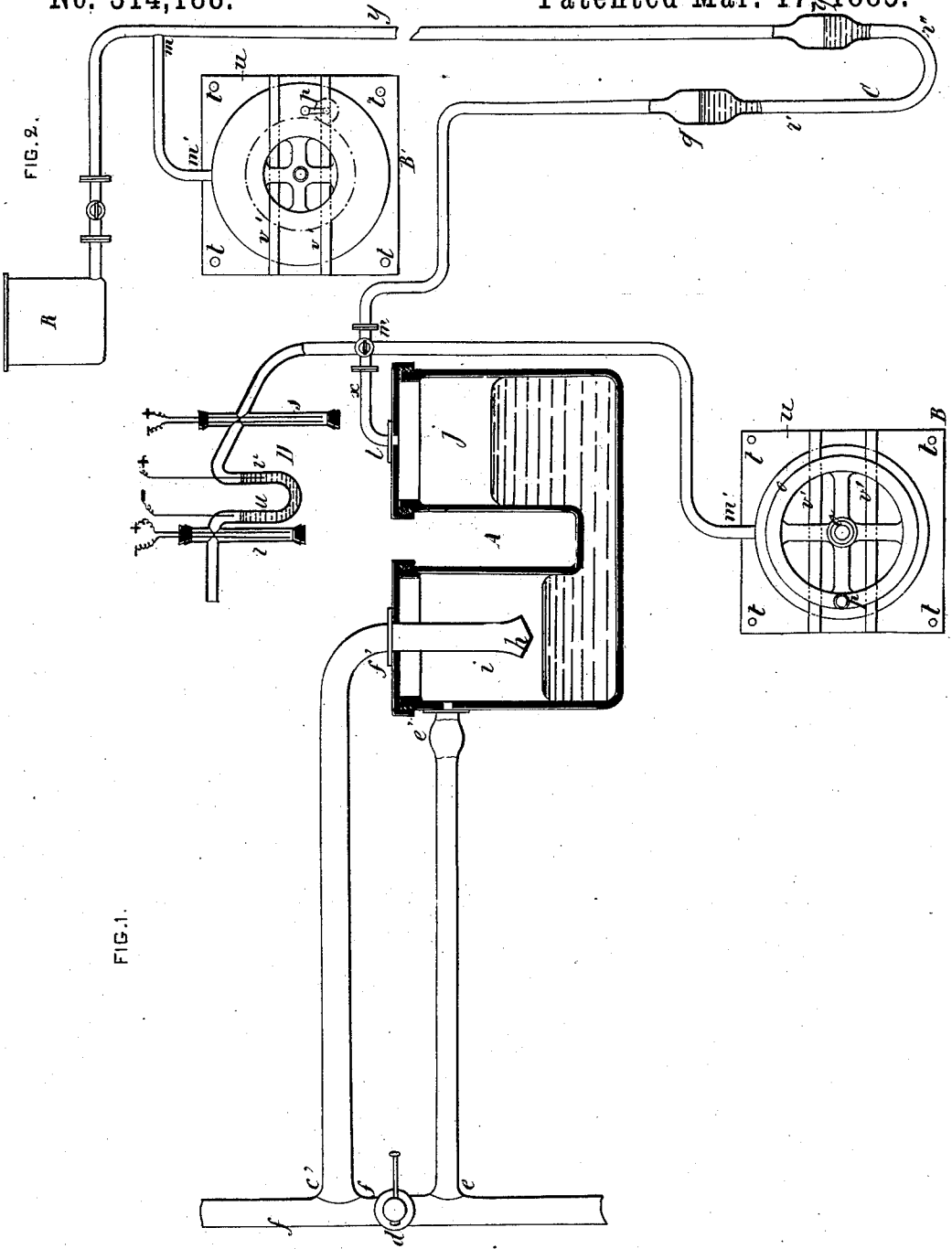

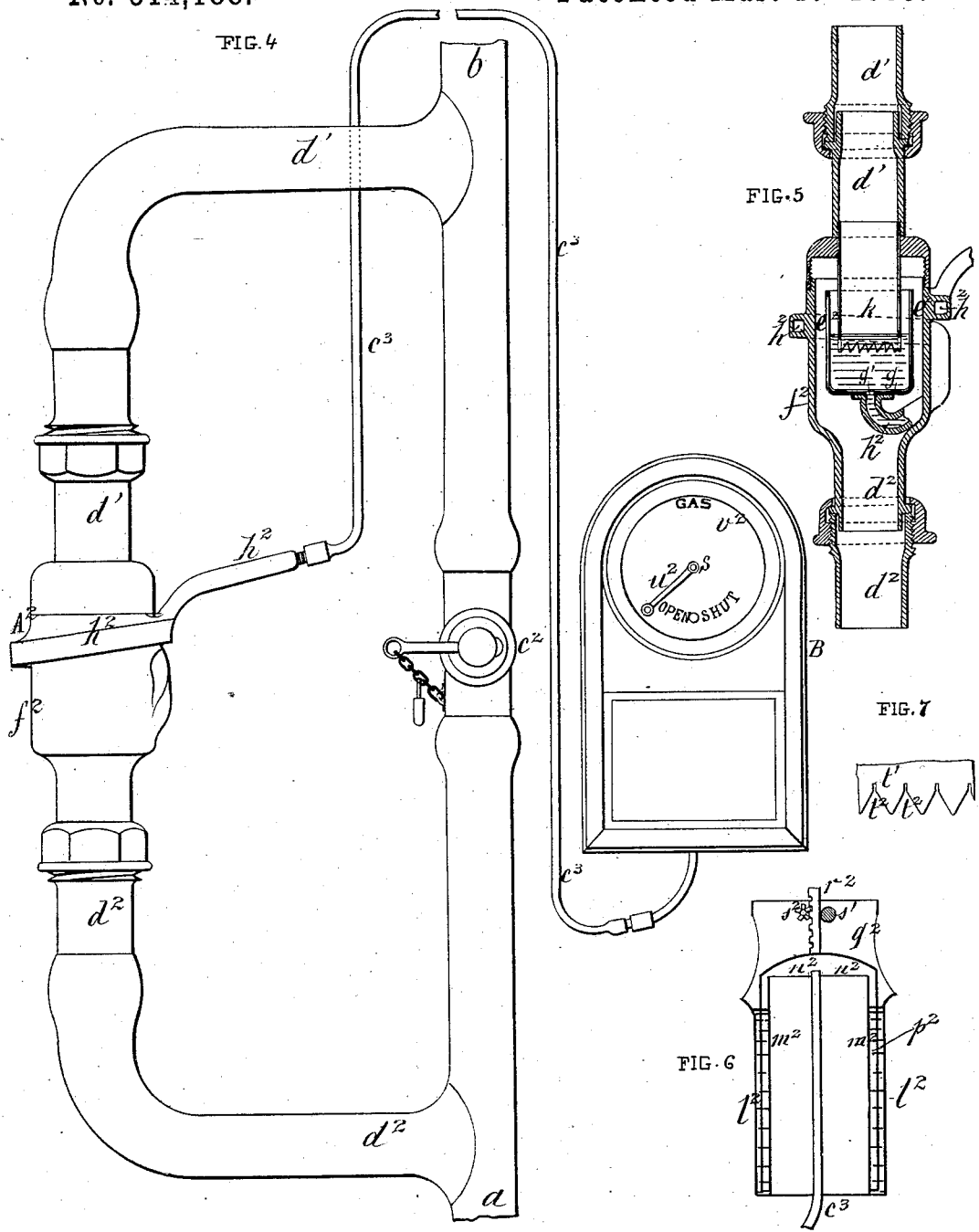

UNITED STATES PATENT OFFICE.

FERDINAND LOUIS MURATORI AND EDOUARD CROS, OF PARIS, FRANCE.

APPARATUS FOR REGULATING OR CONTROLLING FROM A DISTANCE THE FLOW OF GASES.

SPECIFICATION forming part of Letters Patent No. 314,188, dated March 17, 1885.

Application filed February 20, 1884. (No model.) Patented in France August 11, 1883, No. 156,995, and in Belgium August 13, 1883, No. 62,782.

*To all whom it may concern:*

Be it known that we, FERDINAND LOUIS MURATORI and EDOUARD CROS, of the city of Paris, France, have invented new and useful improvements in and relating to apparatus for regulating or controlling from a distance the flow of gases or other fluids through pipes or other conduits, of which the following is a full, clear, and exact description.

Our invention, called the "teledynamic" stop-valve, is for shutting off, regulating, and controlling the flow of fluids from any suitable point. In order to obtain this shutting off from a distance, the level of a liquid in an arrangement of communicating vessels is altered so as to afford a greater or less opening for the passage of the fluid. To transmit to a distance the necessary force for this alteration of level, a fluid is employed by preference which is drawn or forced by a reservoir of variable capacity. Appropriate mechanical means can also be employed for the same purpose, as by a wire or rope passing over guide-pulleys or a series of rods and levers.

Our system of teledynamic stop-valve is composed of four principal parts: first, the stop-valve, properly so called, which is only an arrangement of vessels in communication; second, the compressor or suction apparatus is a reservoir of any suitable form of a variable capacity and acting on the fluid for transmitting power by compressing or exhausting it, according to circumstances, in the arrangement of communicating vessels; third, the compensating-tube or equilibrium-column, an accessory arrangement limiting the force of the transmitting-fluid acting on the surface of the liquid in the arrangement of communicating vessels; fourth, a manometric tube of special form for closing the circuit of an electric alarm in case of accident.

In order that our arrangement of teledynamic stop-valve may be readily understood, two examples are shown in the annexed drawings, as well as several modified arrangements of compressors.

In these drawings, Figure 1 represents a general elevation of our arrangement of stop-valve. Figs. 2 and 2ª represent different forms and arrangements of compressors or exhausters. Fig. 3 shows a modification of the arrangement of stop-valve for automatically shutting off the gas or fluid to be distributed in case of accident. Fig. 4 is a general view of our arrangement of teledynamic stop-valve worked by air, and comprising a stop-valve, A, exhauster or compressor B, and the column of power-transmitting fluid C. Fig. 5 is a central section through the valve A. Fig. 6 is a central section of the exhauster B. Fig. 7 is a full-sized development of part of the cylindrical portion of the dip-tube of the apparatus A.

In all these figures the same reference-letters refer to the same parts.

The example of our arrangement shown is one which can be applied for cutting off at a distance the gas-supply from the town-main to the burners of a house. In this arrangement, before or after the passage of the gas through the meter, (in the actual case on the outlet-pipe $e\,e'$ from the meter,) the pipe is branched to force the gas to pass through the arrangement of stop-valve A before returning into the distributing-pipe $f\,f'\,h$. If the apparatus is not required to work, it is cut out of the circuit by opening the valve $d$. The branch pipe $e\,e'$ opens into one of the communicating vessels $i$, and the exit-pipe for distributing the gas to the burners is continued down into the interior of this vessel, and dips below the surface of the mercury in the vessel about one centimeter when the vessels $i\,j$ are in communication and the mercury in both is under atmospheric pressure. The extremity $h$ of this pipe is beveled, so that the shutting off is gradual and in proportion as the level of the mercury in the vessel $i$ rises under the pressure of the column of power-transmitting fluid, which may be air or other gas or liquid of low density and as little liable as possible to freeze.

Immediately adjacent to the vessel $j$ a special manometer, D, is fixed on the fluid-pipe, as shown in Fig. 1. This manometer, open to the air, contains mercury in the branches $u$ and $v$; but the head of mercury which they contain is less than that in the stop-valve chambers A. This operation will be explained afterward.

To the cover of the vessel $j$ the pipe $l$ for the transmitting-fluid is attached, and to this pipe is connected a branch, $m\ m'$, leading to the compressor B of the said fluid, located in any suitable position on the same story as the meter or on any other story.

The compressor B is fixed on a foundation-plate, $u'$, bolted to a wall by the screws or studs $t$. On this foundation-plate an oblate spheroidal elastic vessel is placed which communicates with the pipe $m'$, and which has its lower part secured to the said plate $u'$. To the said vessel is fixed a screwed rod which carries the boss of a crank-wheel, $o$, that bears against bridge-pieces $v'$, so that when said wheel is turned by its handle $p$ in one direction the upper part of the elastic vessel will be drawn up and the vessel elongated, and the motive fluid thereby sucked up; conversely, when the wheel is turned in the opposite direction.

When the motive fluid employed is a liquid, and the column of this fluid rises above the story where the stop-valve is placed, there is added to the system of stop-valve above described a sliding pipe called a "compensating-pipe." This tube is to bring into equilibrium the column of motive fluid which rises above the level of the mercury of the stop-valve A. This tube C has two receivers or bulbs, $q\ q'$, of the same diameter, united by a bent tube, $r'$, of which the right-hand limb, $r''$, can be lengthened at will, so that the same type of compensator can be always employed in whatever arrangement of building it is to be used. The difference of level between the points $q\ q'$ varies with the height of the column of motive fluid which is above the bulb $q'$. There is thus only the column $q$ of the motive fluid which acts on the mercury of the stop-valve.

The apparatus works in the following manner: The gas coming from the meter or from the town-main comes into the vessel $i$ by the pipe $e$. It can pass out by the dip-pipe $h$, which is supposed to be uncovered by the mercury. The gas passes thence through the distributing-pipe to the several burners. The burners being lighted, if we wish to regulate their consumption from any point whatever of the house, one of the compressors, of which several may be distributed in various places, is acted on in such a manner as to force or exhaust a certain quantity of the motive fluid, whereby the level of the mercury is raised or lowered from $j$ to $i$, and shuts or opens the gas-exit or dip-pipe.

If, by fire or other accident, the pipe for the motive fluid has been broken, at $x$, for example, the column of fluid $l\ x$ falls into the vessel $j$ and raises the mercury in the vessel $i$ so that it shuts the gas-outlet. If, on the contrary, the pipe is broken at $y$, for example, the compensating-column of mercury $r'\ r''$ tends to find its level, and produces a suction in the vessel $j$; but at this moment the mercury of the manometric tube D, forming a safety-tube, is exhausted, and the atmospheric pressure acting on both sides, equilibrium is established in the two vessels $i$ and $j$, thus closing the pipe $h$. Fig. 3 represents the arrangement of the various parts in the event of the column of the motive fluid being broken accidentally.

The arrangement of compressor represented in Fig. 2 at B' comprises a hollow metallic vessel analogous to that described in the compressor B; but the expansion and compression of this vessel is effected much more slowly by working it not directly but by a pinion on the crank-axis gearing with a wheel on the screw-axis.

Notice of the complete shutting off can be given by means of an electric circuit. For this purpose platinum wires are placed in the manometer-tube D—two in the tubes $r$ and $s$, one for each pole of the battery, and one in each tube $u$ and $v$. That in $u$ stops short of the mercury about one centimeter above the surface, while that in $v$ dips in at least two centimeters. These wires communicate with an ordinary electric bell. When the shutting off of the gas is effected under normal conditions, the mercury rises in the limb $u$, and, having reached the wire, temporarily closes the circuit, whereby the bell is caused to ring, but immediately afterward the mercury sinks in limb $u$ so far as to break the circuit and the bell stops. The sounding of the bell is of brief duration and indicates the complete shutting off of the gas.

In case of accident proceeding from the rupture of the column of the motive fluid, at $y$, for example, the suction draws a little mercury into the tube $s$, and the circuit of the alarm being thus permanently closed the bell continues to sound until the accident has been repaired. If infusible pipes are employed for carrying the motive fluid, the heating of the pipe, in case of fire, drives the mercury of the vessel $j$ into the vessel $i$ and the gas is cut off, and at the same time the mercury from $u$ and $v$ passes into the tube $r$, and the bell rings a continual warning.

In case we employ several compressors or exhausters, it is necessary to regulate their relative position, so that one or other of these apparatus is not rendered inefficient at a given moment by the other compressors or exhausters fixed and immovable while one of them is being moved. We therefore prefer an arrangement of teledynamic stop-valve having only one compressor or exhauster, replacing advantageously all the regulators for controlling the emission of gas which have been invented and applied up to now.

Fig. 2$^a$ represents another arrangement of compressor or exhauster, comprising an india-rubber vessel, $v'$, inclosed in a box, $u'$, with rigid sides, a plate, $a'$, which is displaced by the double action of a spring, $b'$, and a working-lever, $c'$, fixed to this vessel and diminishing its capacity.

The inverse movement of the lever $c'$ makes a vacuum by increasing the volume of the vessel $v^2$.

In the stop-valve arrangement represented in Figs. 4, 5, 6, 7 the gas enters at $a$ and passes out at $b$ into the general supply-pipe. $c^2$ is a valve for the direct passage of the gas in case the stop-valve $A^2$ is not in operation. This valve $c^2$ can be locked or otherwise secured, so that it can only be opened in case the valve $A^2$ does not act. The gas passes to the stop-valve at $d^2$, Figs. 4 and 5, passes over and through the cup $e^2$, inclosed in the metal casing $f^2$, which cup shuts hermetically the communication between the pipes $d'$ and $d^2$, which joins the general gas-supply pipe $b$ with the meter or pipe $a$. The bottom $g$ of the cup $e^2$ has a hole, $g'$, and rests on the flange of the pipe $h^2$, which winds spirally upward round the casing $f^2$.

$k$ is a dip-pipe fixed to and of the same diameter as the pipe $d'$. Its lower end is V-notched. The form of notching which has given the best results up to now is the following: If we suppose the diameter of the pipe $k$ to be twenty-four millimeters, we divide the circumference into a number of divisions, so that the area of the triangles $t^2$ multiplied by the number of divisions is equal to that of a circle of twenty-four millimeters diameter. Each of the triangles $t^2$ is prolonged at its apex by another small triangle or notch, $t'$, about one millimeter in length. This arrangement of notches allows of gradual closing, and prevents the flame flickering when burning low.

The exhauster, Figs. 4 and 6, comprises a bell, $q^2$, dipping in mercury $p^2$ between two concentric cylinders, $l^2$ and $m^2$. The latter is closed at bottom and open at top at $n^2$. The continuation of the pipe $c^3$ of the motive fluid passes through the full length of this cylinder. The bell $q^2$ is actuated by the rack $r^2$ and pinion $s^2$, worked by the crank-handle $u^2$, which moves over the dial $v^2$. The abutment $s'$ keeps the rack in gear with the pinion $s^2$.

The apparatus works in the following manner: The cup $e^2$ and the tube $k$, Fig. 5, are filled with mercury to two-thirds their height, for example, and the notches of the tube $k$ dip three centimeters below the surface. Above the mercury which rises in the tube $k$ is a column of air which extends to the bell $q^2$, which dips in the mercury in the cylinder $l^2$. In the interior vessel, $m^2$, is water or air, according to the length of the pipe $c^3$, so as to obtain with the same apparatus a closing by exhaustion, whatever may be the length of the pipe $c^3$. To unclose the valve, the vessel $q^2$ is raised by its rack and pinion and the air is exhausted, while the mercury under the action of the gas-pressure in the stop-valve $A^2$ is depressed by the difference in pressure between the gas and air. The valve is by this means opened more or less by raising the vessel $q^2$, thus regulating the flames of the different burners.

The arrangement of stop-valve described is susceptible of numerous applications. It regulates the consumption of gas in a house, workshop, or theater, and also shuts off the gas in case of fire. The proprietor or owner can without being in the neighborhood of the meter assure himself that it is open, and shut it or diminish the consumption.

In case of fire, the apparatus in its normal condition being closed, the column of motive fluid or cordon of air being destroyed or simply heated to 100° Fahrenheit, (for air, for example,) the closing of the valve is immediate and automatic. The gas is put out and prevented from entering the house. Further, the system of manometric safety-tube furnishes an alarm by an electric bell.

We claim—

1. The combination of the hydraulic stop-valve A with one or more compressors, B, a compensating-tube, C, and a manometer, D, substantially as herein shown and described.

2. The combination, with the hydraulic stop-valve A, of the sliding compensating-tube C, having bulbs $q\,q'$, by which the pressure of the column of motive fluid is balanced by varying the height of the tube according to the height of the said column, as described and represented.

3. The combination of the hydraulic stop-valve A with the manometer safety-tube D, having pipes $u\,v$, and with electric wires placed in said pipes, all arranged to signal the closing, the breaking, or the overheating of the apparatus, substantially as described.

FERDINAND LOUIS MURATORI.
EDOUARD CROS.

Witnesses:
EDWARD P. MACLEAN,
GEORGES COQUET.